Sept. 9, 1969  C. H. SCHWANKL  3,465,796
SAW AIMING DEVICE

Filed June 19, 1967  2 Sheets-Sheet 1

Clarence H. Schwankl
INVENTOR.

BY
Clarence A. O'Brien
and Harvey B. Jackson
Attorneys

Sept. 9, 1969        C. H. SCHWANKL        3,465,796
SAW AIMING DEVICE
Filed June 19, 1967        2 Sheets-Sheet 2
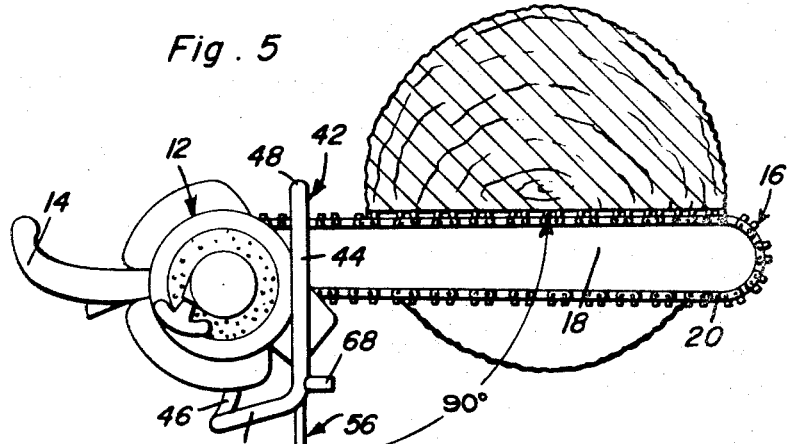
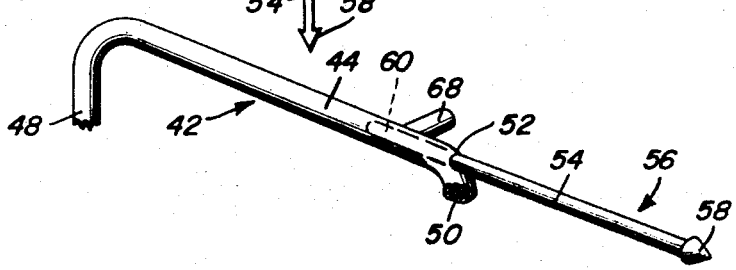
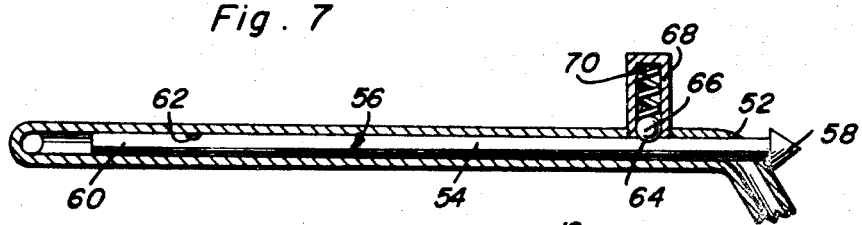
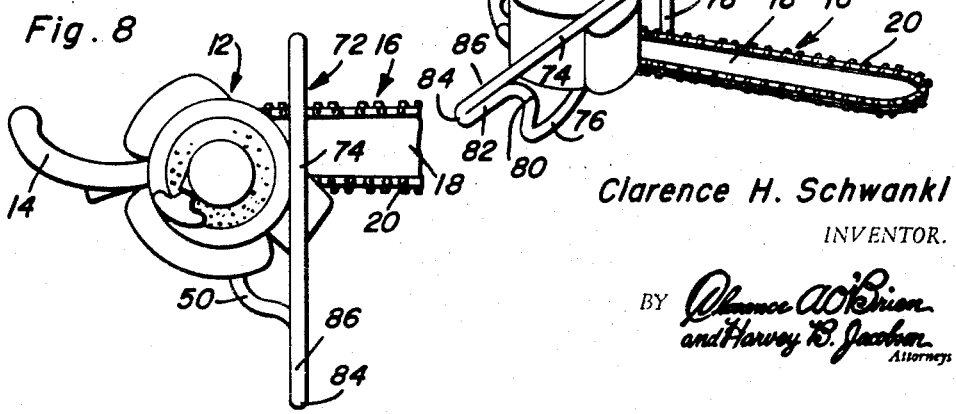
Clarence H. Schwankl
INVENTOR.
BY Clarence A. O'Brien
and Harvey B. Jacobson
Attorneys United States Patent Office 3,465,796
Patented Sept. 9, 1969

3,465,796
SAW AIMING DEVICE
Clarence H. Schwankl, 400 4th St.,
International Falls, Minn. 56649
Filed June 19, 1967, Ser. No. 647,089
Int. Cl. B27b 17/02, 5/38
U.S. Cl. 143—32                                   8 Claims

ABSTRACT OF THE DISCLOSURE

The portable self-powered saw shown is characterized by a self-contained power unit carrying a forwardly projecting saw having the usual elongated plate or bar marginally equipped with an endless chain-type saw operatively connected with the power source. The handgrip at the rear accommodates a sawyer's right hand and the rectangular frame at the front provides a handlebar for the left hand. This saw is improved by adding unique pointer-type aiming means which eliminates guesswork, promotes exacting felling, assures safety, and other advantageous results.

This invention relates to an automatic gear driven chain saw of a type which is currently and commonly used by loggers and sawyers for undercutting a tree which is to be felled and has to do with equipping the saw with feasible aiming means which is preferably, but not necessarily, adapted to be cooperatively associated with the wraparound handle with which the saw is presently provided.

The saw herein shown and described is basically the same as a conventional-type portable self-powered tree felling saw which, as is generally well known, is characterized (see the patent to Gelinas, 2,807,292) by an encased power unit, an elongated chain saw, a rearward handgrip, and a forward wraparound-type handling frame. To the ends desired, the stock components, generally stated, will remain unchanged. The improvement has to do with solving the problem of correctly holding and aiming the saw for safe and reliable undercutting and, in so doing, to indicate the basic directional undercut for felling trees.

Briefly, the invention herein under advisement has to do with a portable power generating unit embodying an upstanding casing or housing and characterized in that it has a rearward vertical side provided with a fixed vertically disposed finger-equipped handgrip which in practice is held by the left hand of the user or sawyer. A somewhat common chain-type saw is provided and embodies, as usual, an elongated flat-faced plate or bar. This bar is affixed at its inner end to a bottom part of the housing and it projects or radiates forwardly from the housing and is marginally encompassed by an endless chain-type saw which is operatively driven, usually by gearing, from the power source in the housing. A forward or front handle is provided and this is of a well-known wraparound-type and is actually in the form of a generally rectangular frame and accordingly embodies a horizontal top member, bottom member and vertical end members connecting the top and bottom members. This frame as a unit is in a horizontal plane and at right angles to the plane of the bar or body of the saw. The significant thing is that aiming means is carried by the saw, more specifically by the frame which constitutes the forward handle, sometimes referred to in the art as a handlebar. The added aiming means is so constructed, designed and adapted that it allows the sawyers while holding and readying the overall saw, to sight-down from a standing or stooping position, to aim the saw correctly and, having done so, to correctly undercut the trunk of the tree for a predetermined directional felling of the tree.

As will be hereinafter more clearly evident, the improved saw enables the sawyer in one positive move to undercut a tree to the exacting degree and extent desired for assured directional felling, minus the guesswork presently resorted to. This accomplishment is achieved through the medium of either a fixed (built-in) or, alternatively, a projectable and retractable aiming and sighting device which the sawyer relies upon to undercut to exactly the point of the trunk of the tree where the tree is to be dropped. Time and labor consuming difficulties and danger-laden hang-ups and extricating problems are virtually overcome. The sawyer can improve his efficiency for the reason he can better plan his procedural felling steps. Once the aiming means is extended and set for use the user can readily sight down the said means (or pointer) from a standing or stooping stance, as the case may be. This step would be similar to standing upright and reading a pocket compass held, let us say, at belt level.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 5 is a top plan view showing the same saw but with a modified aiming device of the built-in extensible and retractable type.

FIG. 6 is a fragmentary perspective view showing a portion of the frame or handle and, more particularly, the built-in aiming device in its ready-to-use position.

FIG. 7 is a view on a slightly enlarged scale and with parts appearing in section and elevation and showing the aiming device retracted and held in its retracted position by a spring-loaded ball detent.

FIG. 8 is a top plan view with the chain saw broken away and which shows a further modification, that is, wherein the frame itself has a portion thereof transformed or converted to provide an integral aiming device.

And FIG. 9 is a view in perspective on a small scale showing the aiming device of FIG. 8.

Figure 1:
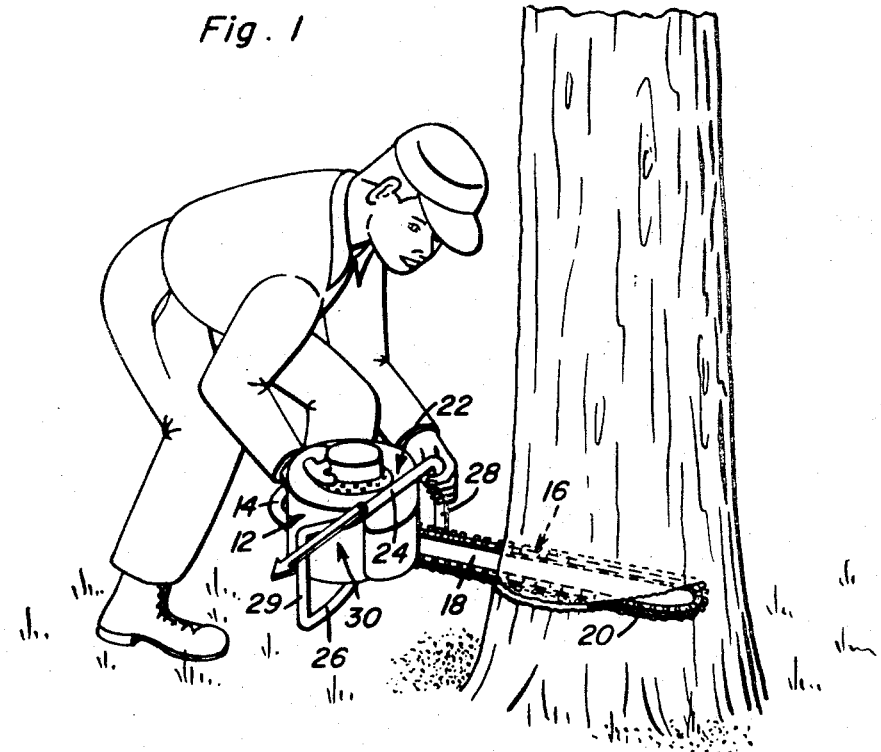
FIG. 1 is a view of the aforementioned portable powered self-contained chain saw showing the sawyer in a stooping position and grasping the rear handle with the right hand and the front handle or handlebar with the left hand, showing the saw in an undercutting position and, what is more important, showing one embodiment of the positioning and aiming device.
Figure 2:
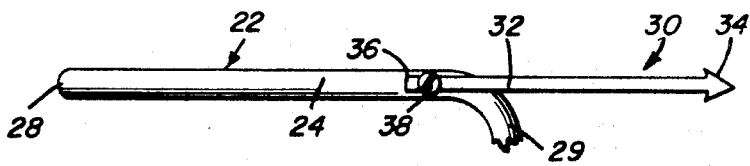
FIG. 2 is a top plan view on an enlarged scale showing the attachment type aiming device illustrated in FIG. 1 with parts broken away for clearness of illustration.
Figure 3:
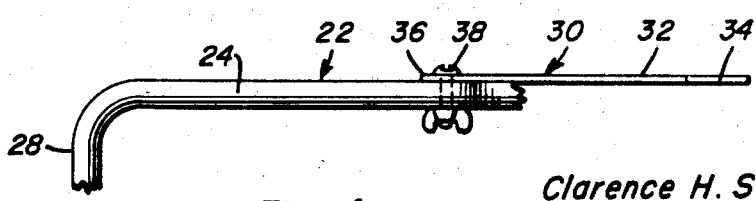
FIG. 3 is a similar fragmentary elevational view showing the edge of the aiming device appearing in FIG. 2.

Referring to FIG. 1 the portable chain saw is of a conventional portable type and embodies, generally stated, an encased or housed self-contained power unit which is denoted by the numeral 12. Since this part is of a well-known type it will not be described in greater detail. The housed or encased unit is provided on its normally vertical rear side with a suitable generally U-shaped handgrip 14 referred to in the trade as a rear trigger-equipped handle or handgrip. The bottom part of the handle-equipped unit is provided with a radial or forwardly projecting elongated chain saw which is denoted generally at 16 and which, broadly stated, comprises a flat plate or bar 18 which is marginally encompassed with an endless power-driven chain saw 20. The front handlebar or handle means is denoted generally by the numeral 22 and, as usual, is of rectangular frame form. It is often referred to as a wraparound-type handle and comprises an upper horizontal frame member 24, a complemental bottom generally parallel frame member 26, a left vertical frame member vertically disposed as at 28 and providing a satisfactory handle and complemental to a similar rearwardly offset vertical end or frame member 29. These component parts are representative of corresponding parts which are found in conventional type portable chain saws.

Figure 4:
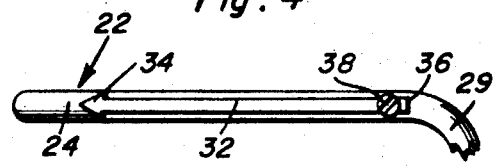
FIG. 4 is a top plan view of the same with the aiming attachment or device retracted or folded to assume an out-of-the-way position.

The improvement resides in the aiming means for undercutting trees which are to be felled in the manner shown in FIG. 1. This means can be considered as an attachment for in-use saws or as a built-in or incorporated aiming and indicating pointer. Then, too, the means here under consideration is intended to comprehend an adaptation wherein the aiming device or means would be made an integral part of the frame or handle 22. With reference now to FIGS. 1, 2, 3 and 4, the attachment type aiming means is shown and it comprises an indicator which is denoted generally by the numeral 30 and comprises a linearly straight flat metal or equivalent arm 32 having a pointer or arrowhead 34 at the outer or right hand end in FIG. 2. The inner end portion 36 resides atop the frame member 24 and is pivotally secured thereto in a suitable manner. The means here comprises a bolt 38 passing through bolt-holes and held in place by a thumb nut in the manner shown at 40 in FIG. 3. Any other equivalent means (not detailed) may be employed so that this means can be extended as shown in full lines in FIGS. 1 to 3 or folded to an out-of-the-way position as shown in FIG. 4.

Referring now to the form of the invention illustrated in FIGS. 5, 6 and 7 and since the saw proper is the same as already described, the same reference numerals are employed to designate like parts. The difference in this form of the invention is in the modified frame or handlebar which for convenience is here designated by the numeral 42 and comprises a horizontal top frame member 44, an offset bottom frame member 46 (FIG. 5) and connecting end members 48 and 50 respectively. The top frame member is primarily involved here and is of tubular construction as shown in FIGS. 6 and 7 in particular. The hollow or tubular portion has an opening 52 at the junctional joint between members 44 and 46 which serves to permit passage of the telescoping rod 54 which constitutes the built-in aiming device or indicator. The indicator is denoted generally by the numeral 56 and the arrowhead on the outer end is denoted at 58. The inner end portion 60 passes through the hole 52 and into the hollow portion where is assumes the retracted state illustrated in FIG. 7. This view also shows a keeper seat at 62, another outer keeper seat at 64. These keeper seats serve to accommodate a spring-loaded detent or ball 66 confined in a laterally offset holder 68 in which a coiled spring 70 is housed. This built-in type aiming device or pointer is one that may be properly adopted by the prospective manufacturer at the time the saw is built at the factory. It will be evident therefore that the concept comprehends either the attachment type shown in FIGS. 1 to 4, or the built-in type shown in FIGS. 5 to 7.

It is also within the purview of the invention to use the slightly modified form of frame which is conveniently denoted in FIGS. 8 and 9 by numeral 72. Again this comprises a rectangular tubular or equivalent frame having an upper frame member 74, a suitably curved and offset lower horizontal frame member 76, a first vertical end member 78 (FIG. 9) and a second specially bent end member 80. This member 80 is bent upon itself as at 82 and 84 and is joined with an extended terminal portion 86 whereby these several features combine in defining a pointer-like indicator. Accordingly the concept comprehends this improved handle with a self-contained aiming device or indicator.

As is evident the views of the drawing are illustrative, but not restrictive, of the generic and species aspects of the overall concept and the invention is to be construed accordingly. In this connection it is reiterated that the invention permits exact felling, virtually eliminates uncertain guesswork, minimizes the likelihood of hang-up of trees, promotes safety, shortens tree felling time, fulfills a long-felt need especially in the logging industry involving large timber and otherwise well serves the purposes for which the invention is suitable.

The foregoing is considered as illustrative only of the principles of the invention. Further, since numerous modifications and changes will readily occur to those skilled in the art, it is not desirable to limit the invention to the exact construction and operation shown and described, and accordingly all suitable modifications and equivalents may be resorted to, failling within the scope of the invention as claimed.

What is claimed as new is as follows:

1. A portable powered saw characterized by a self-contained power unit embodying a housing provided on a rearward vertically disposable side with a fixed vertical handgrip for the right hand of the sawyer and a companion forwardly fixed frame constituting a front handle for the left hand of the sawyer, and a chain-type saw embodying an elongated bar marginally encompassed by an endless chain saw and, in combination, aiming means on said saw designed and adapted to allow the sawyer while holding and readying the overall saw to sight down from a standing or stooping position, aim the saw correctly and, having done so, correctly undercut the trunk of the tree for predetermined directional felling said aiming means embodies a line of vision indicator having a pointer aimed in a predetermined direction relative to the front handle and relative coacting position of said handle.

2. The saw defined in claim 1, and wherein said indicator constitutes an integral component part of said frame.

3. The saw defined in and according to claim 2, and wherein said frame is generally rectangular, embodies horizontal top and bottom members joined by vertical end members, one end of said top member and an adjacent upper end of said vertical member being fashioned into and defining said aiming indicator.

4. The saw defined in and according to claim 1, and wherein said indicator comprises a pointer embodying a straight arm terminating at an outer end in an arrowhead, said arm disposed in a horizontal plane, having an end portion pivotally and adjustably mounted atop an end portion of an upper horizontal member of said frame, said arm when extended for use being in a position at 90° to the bottom plane of the bar of said chain-type saw.

5. The saw defined in and according to claim 1, and wherein said pointer is projectable and retractable and is operatively mounted on an upper horizontal member of said frame.

6. The saw defined in and according to claim 1, and wherein said pointer is projectable and retractable and is operatively mounted on an upper horizontal member of said frame, said upper frame member being tubular and providing a sheath and said pointer embodying an arm telescopingly slidable in said sheath and having an arrowhead at its outer end, said arm being slid out and projected for use and slid back into the sheath when not in use, and having means capable of retaining it "in" or "out" as may be desired.

7. In combination, a portable power generating unit embodying an upstanding housing having a rearward vertical side provided with a fixed vertically disposed trigger-equipped handgrip for the left hand of the sawyer, a chain-type saw embodying an elongated flat-faced plate-type bar affixed at an inner end to a bottom part of said housing and projecting forwardly from the housing and marginally encompassed by an endless chain-type saw operatively driven from said power unit, forward handle means comprising a wrap-around generally rectangular frame embodying horizontal top and bottom frame members, said frame being disposed in a vertical plane at right angles to the horizontal plane of the bar of said saw, and aiming means carried by said frame and cooperable with an end portion of the top frame member and characterized by a direction indicating pointer and adapted to allow the sawyer while holding and readying the over-all saw to sight down from a standing or stooping position, aim the saw correctly and, having done so, correctly undercut the trunk of the tree for predetermined directional felling.

8. The saw defined in and according to claim 7, and wherein said aiming means is embodied in and constitutes a complemental part of and serves in conjunction with said frame.

References Cited

UNITED STATES PATENTS 2,807,292  9/1957  Gelingas.
3,372,718  3/1968  Irgens _____ 143—32

FOREIGN PATENTS 100,685  10/1962  Norway.
422,291  10/1966  Switzerland.

DONALD R. SCHRAN, Primary Examiner

U.S. Cl. X.R.

143—43, 157